United States Patent [19]

Miura

[11] Patent Number: 5,683,801
[45] Date of Patent: Nov. 4, 1997

[54] STYRENIC RESIN LAMINATE AND MOLDING THEREOF

[75] Inventor: Shinichi Miura, Ichihara, Japan

[73] Assignee: Idemitsu Kosan Co., Ltd., Tokyo, Japan

[21] Appl. No.: 638,849

[22] Filed: Apr. 29, 1996

Related U.S. Application Data

[63] Continuation of Ser. No. 390,423, Feb. 17, 1995, abandoned, which is a continuation of Ser. No. 38,270, Mar. 29, 1993, abandoned.

[30] Foreign Application Priority Data

Mar. 30, 1992 [JP] Japan ..................... 4-071915

[51] Int. Cl.$^6$ ..................................... B32B 27/06
[52] U.S. Cl. .................... 428/318.6; 428/319.9; 428/903.3; 428/910
[58] Field of Search ............... 428/318.4, 318.6, 428/318.8, 515, 319.9, 903.3, 910

[56] References Cited

U.S. PATENT DOCUMENTS

| | | | |
|---|---|---|---|
| 4,528,221 | 7/1985 | Komatsuzaki et al. | 428/318.6 |
| 4,680,353 | 7/1987 | Ishihara et al. | 526/160 |
| 5,004,649 | 4/1991 | Yamasaki et al. | |
| 5,089,353 | 2/1992 | Negi et al. | 428/518 |
| 5,109,068 | 4/1992 | Yamasaki et al. | 525/151 |
| 5,270,442 | 12/1993 | Nakano | 528/481 |

FOREIGN PATENT DOCUMENTS 0064 808  11/1982  European Pat. Off. .

OTHER PUBLICATIONS

Database WPI, AN–90–087693, JP–A–02 041 225, Feb. 9, 1990.
Chemical Abstracts, vol. 110, No. 16, Apr. 17, 1989, AN–136588v, JP–A–63 278 831, Nov. 16, 1988.
Chemical Abstracts, vol. 115, No. 14, Oct. 7, 1991, AN–137747m, JP–A–03 126 521, May 29, 1991.

Primary Examiner—Marion E. McCamish
Assistant Examiner—Blaine R. Copenheaver
Attorney, Agent, or Firm—Oblon, Spivak, McClelland, Maier & Neustadt, P.C.

[57] ABSTRACT

There are disclosed a styrenic resin laminate comprising at least one surface layer consisting essentially of a styrenic polymer having a high degree of syndiotactic configuration (SPS layer) and a foam layer (other layer) consisting essentially of a styrenic resin (GPPS, IPS, HIPS, ABS resin, SMA copolymer, AS resin, modified PPO; blend of HIPS/PPO, etc); and a molding obtained by thermoforming the above-mentioned laminate. The above laminate is particularly excellent in heat resistance and easily thermoformable into the molding, which is also excellent in heat resistance and recyclability in terms of retention of flexural strength, utilizable in heating oil-base food with a microwave range and can easily be recovered for reuse, thereby greatly contributing to environmental preservation and resources saving.

13 Claims, No Drawings

STYRENIC RESIN LAMINATE AND MOLDING THEREOF

This is a continuation of application Ser. No. 08/390,423, filed on Feb. 17,1995, now abandoned, which is a Continuation of application Ser. No. 08/038,270, filed on Mar. 29, 1993, also abandoned.

BACKGROUND OF THE INVENTION

1. Field of the Invention

The present invention relates to a styrenic resin laminate and a molding thereof. More particularly, it pertains to a styrenic resin laminate which is excellent in heat resistance and a molding which is produced therefrom and excellent in recyclability in that it can dispense with sorting and separation at the time of recycling.

2. Description of the Related Arts

At the present time, household processed food from fish, meat or the like is usually placed in a plastic tray and properly covered with a plastic film for sale. In many cases of cooking, the processed food is cooked by heating with a microwave range, etc. while being placed in a plastic tray as such, and the tray is throwaway.

A polystyrene foam sheet has heretofore been used as a material for such cooking in many cases, but is not suitable for being heated with a microwave range because of its poor heat resistance. In order to overcome the defect and enhance heat resistance of the tray material, styrene/maleic anhydride copolymer (SMA) is used in place of polystyrene.

The use of SMA as the tray material in heating with a microwave range does not cause any problem for aqueous food in the tray, but causes a problem for food containing a considerable amount of oil or fat in that heating to 120° C., approximately is beyond the limit of heat resistance. As a means for enhancing the heat resistance, there is proposed to laminate a film of polypropylene resin or polyester resin on SMA. The laminate is improved in heat resistance but neverthless involves the problem that the physical properties thereof are considerably deteriorated when recycled as scraps after use as the tray material. In order to reduce the deterioration of the physical properties, difficult and troublesome sorting work is required in the course of recycling and, therefore in fact, recovery and recycling of the laminate is not put into practice.

Under such circumstances, intensive research and investigation were concentrated by the present inventor on the development of a styrenic resin laminate which is excellent not only in resistance to heating with a microwave range but also in recyclability.

As a result, it has been found by the present inventor that the laminate having at least one surface layer consisting essentially of a styrenic polymer having a high degree of syndiotactic configuration is effective as a raw material, and the molding obtained by thermoforming the above-mentioned laminate is well suited for the purpose of containing the food to be cooked with a microwave range. The present invention has been accomplished on the basis of the aforesaid finding and information.

SUMMARY OF THE INVENTION

Specifically, the present invention provides a styrenic resin laminate which comprises at least one surface layer consisting essentially of a styrenic polymer having a high degree of syndiotactic configuration and a foam layer as the other layer consisting essentially of a styrenic resin and at the same time, a molding produced by thermoforming the aforestated styrenic resin laminate.

DESCRIPTION OF PREFERRED EMBODIMENTS

In the first place the styrenic resin laminate according to the present invention is characterized by making use of a styrenic polymer having a high degree of syndiotactic configuration (hereinafter sometimes referred to as "SPS") as one of raw materials for the laminate. By the aforesaid high degree of syndiotactic configuration is meant that its stereochemical structure is of a high degree of syndiotactic configuration, i.e. the stereostructure in which phenyl groups or substituted phenyl groups as side chains are located alternately at opposite directions relative to the main chain consisting of carbon-carbon bonds. Tacticity is quantitatively determined by the nuclear magnetic resonance method ($^{13}$C-NMR method) using carbon isotope. The tacticity as detremined by the $^{13}$C-NMR method can be indicated in terms of proportions of structural units continuously connected to each other, i.e., a diad in which two structural units are connected to each other, a triad in which three structural units are connected to each other and a pentad in which five structural units are connected to each other. "The styrenic polymer having such a high degree of syndiotactic configuration" as mentioned in the present invention usually means polystyrene, poly(alkylstyrene), poly(halogenated styrene), poly(halogenated alkylstyrene), poly(alkoxystyrene), poly (vinyl benzoate), hydrogenated polymers thereof, the mixtures thereof, and copolymers containing the above polymers as main components, each having in the chain of styrenic repeating units, such a syndiotacticity, that the proportion of racemic diad is desirably at least 75%, more desirably at least 85%, or the proportion of racemmic pentad is desirably at least 30%, more desirably at least 50%.

Examples of the poly(alkylstyrene) includes poly (methylstyrene), poly(ethylstyrene), poly(isopropylstyrene), poly(tert-butylstyrene), poly(phenylstyrene), poly (vinylnaphthalene), poly(vinylstyrene). Examples of the poly(halogenated styrene) include poly(chlorostyrene), poly (bromostyrene), and poly(fluorostyrene). Examples of the poly(halogenated alkylstyrene) include poly (chloromethylstyrene). Examples of the poly(alkoxystyrene) include poly(methoxystyrene) and poly(ethoxystyrene). In addition, the comonomers of the copolymers having the aforesaid constitutional unit are exemplified by, in addition to the above-mentioned monomers usable in the styrenic polymers, olefin monomer such as ethylene, propylene, butene, hexene and octene; diolefin monomer such as butadiene and isoprene; cyclic olefin monomer; cyclic diolefin monomer; and polar vinyl monomer such as methyl methacryalte, maleic anhydride and acrylonitrile. Particularly desirable styrenic polymer among them are polystyrene, poly(alkylstyrene), poly(halogenated styrene), hydrogenated polystyrene and copolymers having any of these constitutional units.

The styrenic polymer having such syndiotactic configuration can be produced by polymerizing a styrenic monomer which corresponds to the above styrenic polymer in the presence or absence of a solvent such as an inert hydrocarbon by the use of a catalyst comprising a titanium compound and a condensation product of water and trialkylaluminum (Japanese Patent Application Laid-Open No. 187718/1987). In addition, the poly(halogenated alkylstyrene) and the hydrogenated product thereof can be produced by the processes described in Japanese Patent Application Laid-Open Nos. 46912/1989 and 178505/1989, respectively.

The weight-average molecular weight of SPS is not specifically limited but is usually at least 50,000, preferably 100,000 to 2,000,000. A weight-average molecular weight of SPS less than 50,000 may undesirably results in excessive draw-down at the time of heating and failure to achieve favorable mold reproducibility at the time of thermoforming.

The above-mentioned styrenic polymer may be compounded with a rubber or a resin other than styrenic polymer for the purpose of improving the impact resistance and moldability and utilized as a composition inasmuch as the effect of the present invention is not impaired by the compounding. There are available a variety of rubbers compoundable with SPS without limitation to the kind thereof, of which is most suitable a rubbery copolymer containing a styrenic compound as one of the components. Examples thereof include styrene/butadiene copolymer rubber (SBR); styrene/butadiene block copolymer (SB, SBS, BSB, etc.); styrene/hydrogenated butadiene block copolymer (SEBS, SEB, etc.); styrene/isoprene block copolymer (SI, SIS, ISI, etc); styrene/hydrogenated isoprene block copolymer (SEP, SEPS, etc.); granular elastomer obtained by polymerizing a vinylic monomer in the presence of a polymer obtained by polymerizing at least one monomer selected from the group consisting of alkyl methacrylate and polyfunctional monomer having a conjugated diene type double bond, said elastomer being exemplified by acrylonitrile/styrene-grafted butadiene rubber (ABS); acrylonitrile/styrene-grafted butadiene/butyl acrylate rubber (AABS); methyl methacryalte/styrene-grafted butyl acrylate rubber (MAS); styrene-grafted butadiene rubber (SB); methyl methactylate/styrene-grafted butadiene rubber (MBS); methyl methacrylate/styrene-grafted butadiene/butyl acrylate copolymer rubber (MABS).

Other examples of rubbery copolymers include at least one block or graft copolymer selected from A-B block copolymer, A-grafted B copolymer and B-grafted A copolymer wherein A indicates at least one styrenic polymer or styrenic copolymer selected from the group consisting of atactic polystyrene; acrylonitrile/styrene random copolymer; styrene/maleic anhydride random copolymer; styrene/acrylonitrile/maleimide anhydride random copolymer; styrene/methyl methacrylate random copolymer; and styrene/methacrylic acid random copolymer, and B stands for at least one polymer selected from the group consisting of polybutadiene; polyisoprene; hydrogenated polybutadiene; hydrogenated polyisoprene; polycarbonate; polyamide; poly(methyl methacrylate); polyethylene terephthalate; and polybutylene terephthalate. The rubbery copolymers comprising a styrenic compound as one of the component have favorable dispersibility in SPS and as the result, exert a marked effect on the improvement in the physical properties of the resultant composition.

Still other examples of rubbers include natural rubber; polybutadiene; polyisoprene; polyisobutylene; neoprene rubber; ethylene/propylene copolymer rubber; polysulfide rubber; Thiokol rubber; acrylic rubber; urethane rubber; silicone rubber; epichlorohydrin rubber; polyether ester rubber; and polyester ester rubber.

As the resin of different type which may be compounded with the foregoing styrenic polymer, a variety of resins are available without limitation to the kind thereof, and exemplified by styrenic polymer having atactic or isotactic configuration, polyphenylene ether, styrene/maleic anhydride copolymer etc. The above resins are easily compatible with the aforestated styrenic polymer having syndiotactic configuration, are effective in controlling the crystallization, facilitate the control of molding conditions and enable the production of a molding excellent in dynamical properties. In the case where a styrenic polymer having atactic and/or isotactic configuration is incorporated, it is preferably composed of styrenic monomers same as those constituting the styrenic polymer having syndiotactic configuration. The compatible resin component is preferably used in an amount of 70 to 1% by weight, preferably 50 to 2% by weight based on the total weight of both the resins. Examples of incompatible resins which may be added to the styrenic polymer include polyolefins such as polyethylene, polypropylene, polybutene and polypentene; polyesters such as polyethylene terephthalate, polybutylene terephthalate and polyethylene naphthalate; polyamides such as nylon 6 and nylon 6,6; polythioethers such as polyphenylene sulfide; polycarbonate; polyarylate; polysulfone; polyether ether ketone; polyether sulfone; polyimide; halogenated vinylic polymer such as Teflon; acrylic polymer such as methyl methacrylate; polyvinyl alcohol, that is, all the resins other than the above-described compatible resins, and further, crosslinked resin containing the aforestated compatible resins. In the case where the foregoing incompatible resin is incorporated in the styrenic polymer with syndiotactic configuration according to the present invention in a small amount, it can be dispersed in the syndiotactic styrenic polymer just like islands in the sea because of its incompatibility. The abovementioned result is useful in providing the orientated resin with favorable gloss or in improving surface slipperiness of the resin. The content of the incompatible resin component is desirably 50 to 2% by weight for the purpose of glossiness and 0.001 to 5% by weight for the purpose of controlling the surface property. For the resin product to be used at a higher temperature, the incompatible resin which is relatively heat resistant is preferably employed.

The aforestated other layer (that is, the intermediate layer or the surface layer other than the SPS layer), when constituting the intermediate layer of the laminate having at least one surface layer (that is, both the surface layers or one side surface layer) consisting essentially of SPS, comprises one foam layer consisting essentially of a styrenic resin, which may be compounded with, as desired, a rubber or the like. In the case of a molding being produced by vacuum forming, pressure forming or vacuum-pressure forming, it is preferably to employ a styrenic resin capable of easily causing a large deformation under heating. The usable styrenic resin is not specifically limited in its type, but is exemplified by general-purpose polystyrene resin (GPPS) of atactic configuration, polystyrene resin of isotactic configuration, HIPS (high impact polystyrene resin), ABS resin (acrylonitrile/butadiene/styrene resin), SMA (styrene/maleic anhydride copolymer), AS resin (acrylonitrile/styrene resin) and modified PPO (blend of HIPS and polyphenylene ether), which may be used alone or in combination with at least one other styrenic polymer.

The aforestated other layer, when constituting the layer other than the intermediate layer (that is, the layer other than the SPS layer and the foam layer consisting essentially of a styrenic resin) comprises SPS to be mentioned at first, the above-mentioned strenic resin or the resin other than the styrenic resin.

In the present invention, the foam layer of the above-mentioned styrenic resin is laminated onto the surface layer in the form of sheet consisting essentially of SPS. The foam layer is produced by foaming the aforementioned styrenic resin by the conventional method usually using a foaming agent, which is exemplified by decomposable foaming agent including inorganic compounds such as sodium hydrogencarbonate, ammonium carbonate and ammonium hydrogen-carbonate and organic compounds such as azodicarbonamide, azobis(isobutyronitrile), diazoaminobenzene and terephthalazide and volatile foaming agent such a propane, butane, isopentane and flon (fluorohydrocarbon, chlorofluorohydrocarbon etc.).

The foam layer of the styrenic resin can be formed, for example, by impregnating the styrenic resin with the above-mentioned volatile foaming agent and heating the impregnated resin to a temperature higher than the evaporation temperature of the foaming agent, or by sufficiently kneading the styrenic resin with the decomposable foaming agent, followed by heating to a temperature higher than the decomposition temperature of the foaming agent, the former being prevailing. In these cases, the expansion ratio is regulated generally to the range of 5 to 100 without specific limitation usually by controlling the dosage of the foaming agent, heating temperature, etc.

The laminate of the present invention can be produced by laminating the foam layer of the styrenic resin and the surface layer consisting essentially of SPS so as to form at least one surface layer in the laminate.

The method for laminating the foam layer of the styrenic resin and the surface layer consisting essentially of SPS may be selected, as required, from the conventional methods such as coextrusion method, extruding lamination method, dry lamination method and thermal lamination method, among which the following methods (1), (2) and (3) can be specifically exemplified. (1) SPS and a foamable styrenic resin impregnated or mixed with a foaming agent are subjected to multilayer extrusion by means of a molding machine having a multilayer die, followed by cooling solidifying for forming a double layer laminate. In order to enhance the interlaminar adhesivity during the above-mentioned step, an adhesion layer as the third component having affinities for both the SPS layer and the foam layer of the styrenic resin may be placed therebetween, or either or both of the SPS and the styrenic resin as the foam layer may be compounded in advance with an adhesive. (2) A film or sheet of SPS (oriented or non-oriented) is prepared in advance and is laminated with the foam layer of the styrenic resin in molten state that has been extruded through an extruder having a T-die separately, followed by cooling solidifying, or conversely, the foam layer of the styrenic resin is prepared in advance and is laminated with SPS in molten state, followed by cooling solidifying. The laminate of the present invention can be prepared by the aforestated method (2), in which, as is the case with the method (1), an adhesion layer may be placed or an adhesive may be compounded in order to enhance the interlaminar adhesibity. (3) The laminate of the present invention can be prepared by the method (3), wherein a film or sheet of SPS (oriented or non-oriented) and the foam layer of the styrenic resin are prepared separately and then laminated by pressing under heating. The film or sheet of each of SPS and the styrenic resin may be subjected to corona discharge treatment, ozone treatment or the like prior to the lamination, since the treatment is extremely effective for enhancing adhesibity. In addition, an interlaminar adhesive (for example, an adhesive for dry laminate such as curable urethane-base adhesive) may be applied. It is suitable in lamination to set the press roll temperature at 120 to 240° C., approx. and the processing rate at 50 to 150 m/min.

The laminate of the present invention is not specifically limited with regard to the exposed surface (other than the adhesion surface) of the foam layer provided that the inner most layer to be in contact with the content in a molding is constituted of SPS. Accordingly, the laminate may be made of three or more layers, in which at least one layer consisting of SPS or other resin as mentioned hereinbefore is further laminated onto the surface of the foam layer of the styrenic resin not in contact with the inner most SPS layer. Examples of the other resin usable as required include polystyrene, polyethylene, polypropylene, polyethylene terephthalate and polyamide, among which is preferable styrenic resin taking into consideration the recylability after use. Needless to say, an interlaminar adhesive of polyurethane-base, etc. may be employed to enhance interlaminar adhesivity.

In the above-mentioned method for preparing the laminate, the molten resin is cooled for solidification by the use of a refrigerant such as gas, liquid, a metallic roll or the like. In the case of a metallic roll being employed, the application of an air knife, an air chamber, a touch roll or electrostatic charging is effective for preventing uneveness of thickness and waviness of the film. The cooling solidifying is carried out usually at a temperature ranging from 0° C. to the temperature 30° C. higher than the glass transition temperature (Tg) of the SPS, preferably ranging from the temperature 70° C. lower than the Tg to the Tg. The cooling rate is suitably selected in the range of 200° to 3° C. per second.

The thickness per one layer of the SPS layer/s is not specifically limited but is preferably in the range of 2 to 2000 µm. A thickness thereof less than 2 µm and that exceeding 2000 µm unfavorably make it difficult to control the crystallization and hence produce a uniform layer. The above-mentioned range is satisfactory in view of the effect on the laminate.

The SPS layer to be used as a film or a sheet may be non-oriented or oriented uniaxially or biaxially. The ratio of the thickness of the foam layer of the styrenic resin to the thickness of the SPS layer is, for example, 4 to 25,000 in the case of the laminate made of directly lamiated two layers comprising a SPS layer and a foam layer of the styrenic resin. Similarly in the case of at least three layer construction, the ratio of the total thickness of the foam layer and the layer other than the SPS layer to the total thickness of the SPS layer/s is also 4 to 25,000 (that is, the quotient obtained by dividing the total thickness of the layer/s other than SPS by the total thickness of the SPS layer/s). The ratio less than 4 or more than 25,000 is unfavorable in view of economical efficiency or thermoformability.

The molding of the present invention is produced by thermoforming the styrenic resin laminate obtained as stated above, under pressure by the use of a mold having the desired shape. The thermoforming method is not specifically limited but may be selected as required from vacuum forming, pressure forming and matched mold forming each being favorably usable. As the forming equipment, there is usable the one which has heretofore been generally employed as such. The pressurizing can be carried out by suitably combining a plug with vacuum, pressure or vacuum-pressure and without a plug in a similar manner. The method for heating the laminate is not specifically limited but may be suitably selected from indirect heating method with a ceramics-sealed electric heater or hot oil, and direct heating method with a heating plate which is brought into direct contact with the laminate. In order to assure the formability of the surface layer consisting essentially of SPS in the course of heating, the heating temperature shall be in the range of the glass transition temperature of the SPS (Tg) to the temperature lower than the melting temperature of the same (Tm) by 15° C. (Tm−15), preferably in the range of Tg+10° C. to Tg+120° C. A heating temperature lower than Tg makes it difficult to sufficiently carry out molding, whereas that higher than Tm–15° C. may unfavorably cause bridging in the surface layer of the SPS or, in the case of a plug being used, adhesion of the material to the plug.

The foam layer of the styrenic resin and the resin layer comprising other thermoplastic resin composition which is arranged, as required, on the other side of the foam layer are preferably capable of being deformed simultaneously with the SPS layer under the same condition as above. Accordingly, the thermoplastic resin to be employed shall have a glass transition temperature of Tm–15° C. or lower, preferably Tg+120° C. or lower and may be selected from, in addition to those described hereinbefore, polybutene, polypenetene, polyvinyl chloride, polybutylene terephthalate, polyethylene naphthalate, polyamide 6, polyamide 6.6, polycarbonate, polyphenylene sulfide, polysulfone, poly(methyl methacrylate) and modified polyphenylene ether and the like.

The temperature of the thermoforming mold is preferably in the range of 30° C. to Tm–15° C. A temperature thereof lower than 30° C. results in difficulty in proceeding with crystallization sulfficient for providing the molding with heat resistance, whereas that higher than Tm–15° C. may unfavorably brings about adhesion of the material to the mold or difficulty in mold releasing.

It has been found by the present inventor that the heat resistance of the molding is closely related to the crystallinity of the SPS after final thermoforming of the laminate. Specifically, the crystallinity necessary for providing sufficient heat resistance is 10% or more, desirably 20% or more, particularly desirably 25% or more. A molding having a crystallinity less than 10% can not be gifted with sufficient heat resistance. The final crystallinity after the thermoforming of the SPS can be favorably controlled by thermoforming conditions such as laminate temperature and holding time in laminate heating, mold temperature and holding time in a mold.

The thermoformed body obtained by the above-mentioned method is remarkably excellent in heat resistance and favorably usable in heating oil-base food placed in it with a microwave range. Furthermore, it is characterized by the advantages as described hereunder.

In general, in the course of producing a molding by thermoforming a raw material of resin in the form of sheet, the step of cutting off the peripheral part of the molding is indispensable after the thermoforming. The trimming loss in the aforesaid step sometimes reaches as high as 50% of the total usage of the resin. Under such circumstances, utmost importance should be attached not only to the recovery and recycling of the cut off resin from the viewpoint of environmental problem as well as cost efficiency, but also to the recovery and reuse of the used resin as recyclable resource.

The recovery and recycling of a multilayer laminate have heretofore been regarded as being difficult because of its inherent constitution. Nevertheless the above serious problem can be solved by the present invention in the following manner. Specifically, it is possible to compatibilize SPS with a styrenic polymer other than SPS including atactic polystyrene resin, isotactic polystyrene resin, ABS resin, AS resin and the like in an arbitrary proportion by means of heat melting and kneading. Here, by appropriately selecting the compounding ratio of SPS, for example, at 30% or less by weight, it follows that the physical properties of the mixture containing the SPS extremely lowered in its crystallinity approach to those of the mixture containing atactic polystyrene in place of the same amount of SPS. Therefore, a laminate of AS resin or the combination of AS resin and ABS resin which has been reheated and kneaded for the sake of recovery and reuse may be dealt with as if it were a laminate of the ordinary composition of AS/polystyrene or ABS/polystyrene. In particular, in the case of a laminate of SPS and atactic polystyrene, the recovered laminate can be reused as such as the laminate of the atactic polystyrene, thereby greatly facilitating recovery and recycling in spite of its being a laminate.

In summary, the laminate of the present invention is excellent in heat resistance and easily thermoformable into the molding, which is excellent in heat resistance and recyclability, utilizable in heating oil-base food with a microwave range and can easily be recovered and reused.

In the following, the present invention will be described in more detail with reference example, preparation exmaple, working example (simplified as "exmaple") and comparative example.

REFERENCE EXAMPLE

In a 500 ml glass vessel which had been purged with argon were placed 17.8 g (71 mmol) of copper sulfate pentahydrate ($CuSO_4 \cdot 5H_2O$), 200 ml of toluene and 24 ml (250 mmol) of trimethylaluminum, which were then reacted at 40° C. for 8 hours. Then, the solids were separated from the reaction mixture and toluene was distilled away from the solution as obtained above under reduced pressure at room temperature to produce 6.7 g of a contact product. The molecular weight thereof as determined by the freezing point depression method was 610.

PREPARATION EXAMPLE 1

(Preparation of SPS-1)

In a 2 L (L=liter) reaction vessel were placed 1L of purified styrene, the contact product as obtained in the above Reference Example in an amount of 5 mmol as aluminum atom, 5 mmol of triisobutylaluminum and 0.025 mmol of pentamethylcyclopentadienyltitanium trimethoxide, which were then subjected to polymerization reaction at 90° C. for 5 hours. After the completion of the reaction, the catalytic components were decomposed with a solution of sodium hydroxide in methanol and then the reaction product was washed with methanol repeatedly and dried to afford 308 g of polymer. As the result of analysis by gel permeation chromatography using 1,2,4-trichlorobenzene at 135° C. as the solvent, the polymer thus produced had a weight-average molecular weight of 400,000 and a ratio of weight-average molecular weight to number-average molecular weight (Mw/Mn) of 2.

It was confirmed that the polymer was polystyrene having syndiotactic configuration (SPS) from the results of melting point measurement and $^{13}C$-NMR analysis.

PREPARATION EXAMPLE 2

(Preparation of SPS-2)

In a 2 L (L=liter) reaction vessel were placed 965 ml of purified styrene, 70 ml of p-methylstyrene, the contact product as obtained in the above Reference Example in an amount of 7.5 mmol as aluminum atom, 7.5 mmol of triisobutylaluminum and 0.038 mmol of pentamethylcyclopentadienyltitanium trimethoxide, which were then subjected to polymerization reaction at 90° C. for 5 hours. After the completion of the reaction, the catalytic components were decomposed with a solution of sodium hydroxide in methanol and then the reaction product was washed with methanol repeatedly and dried to afford 308 g of polymer. As the result of analysis by gel permeation chromatography using 1,2,4-trichlorobenzene at 135° C. as the solvent, the polymer thus produced had a weight-average molecular weight of 340,000 and a ratio of weight-average molecular weight to number-average molecular weight (Mw/MN) of 2.4.

It was confirmed that the polymer was styrene/p-methylstyrene copolymer having syndiotactic configuration (SPS) from the results of melting point measurement and $^{13}$C-NMR analysis.

The content of p-methylstyrene in the resultant copolymer was found to be 7.1 mol% as the result of proton nuclear magnetic resonance method ($^1$H-NMR).

EXAMPLES 1 TO 8 AND COMPARATIVE EXAMPLES 1 TO 5

SPS-1 and SPS-2 as obtained in Preparation Example 1 and Preparation Example 2, respectively were melt extruded with an extruder and thereafter placed in close contact with a metallic cooling roll to produce SPS sheets.

Then, foamable polystyrene beads (GPPS, produced by Idemitsu Petrochemical Co., Ltd.) were melt blended with a volatile foaming agent and extruded by the use of an extruder to produce foam sheets of polystyrene.

Immediately thereafter, the above-produced SPS sheet was directly laminated onto the resultant foam sheet by means of continuous lamination, followed by solidification by cooling with a chilled roll to produce a laminate (extrusion lamination A).

On the other hand, onto a foam sheet of polystyrene which had been prepared in advance was directly laminated a SPS sheet which was melt extruded with an extruder by means of continuous lamination to produce a laminate (extrusion lamination B).

The laminates thus obtained were theremoformed under respective conditions into the moldings each in the form of a tray so that the SPS layer constitutes the innermost layer of the tray.

In order to evaluate the performance of each of the moldings thus obtained, heat resistance and recyclability in terms of retention of flexural strength were determined and the appearance was visually observed. The results of the performance evaluation are given in Table 1, in which the abbreviation of resin signifies the following.

PET: polyethylene terephthalate

PP: polypropylene

GPPS: general-purpose polystyrene resin

HIPS: high impact polystyrene resin

SMA: styrene/maleic anhydride copolymer

PPO: modified PPO from HIPS/PPO blend

The SPS layer was delaminated from the laminate thus obtained and the crystallinity of the SPS layer was determined by means of a differential scanning calorimeter (DSC). Specifically, there were obtained the endothermic enthalpy at the melting point under a definite temperature rise rate ($\Delta$Hm), the exothermic enthalpy at the cold crystallization temperature ($\Delta$Hcc), the fusion enthalpy at 100% crystallinity ($\Delta$Hf: 53 J/g) and the content by weight of SPS in SPS composition layer (C) to define the crystallinity (Xc) by the following formula $$Xc = (\Delta Hm - \Delta Hcc)/\Delta Hf \cdot C$$

Heat resistance and recyclability were determined in the following way.

(1) Heat resistance: A mixture of water and oil (1:1 volume ratio) was poured into the molding, which was heated with a 1 kW microwave heater until the temperature of the mixture was raised to 120° C. Thereafter, the mixture and the molding were allowed to cool, while the condition of the molding was evaluated by the following three-step marks:
A: no abnormality
B: molten inner surface
C: large deformation (2) Recyclability: The molding was crushed into powder, which was melt kneaded with a single-screw extruder having a cylinder the temperature of which was set at 290° C. to produce pellet. The resultant pellet was injection molded with an injection molding machine with a mold clamping force of 100 metric tons and a mold temperature of 50° C. at a molding temperature of 230° C. to produce test pieces. Then measurements were made of the flexural strength of the test pieces thus obtained in accordance with JIS K 7203, and the retention of flexural strength was calculated based on the flexural strength of the styrenic resin that was used for preparing the foam layer.

TABLE 1

| | First layer | | | Second layer, Foam layer | | | Third layer | | |
|---|---|---|---|---|---|---|---|---|---|
| | Resin | Thickness (μm) | Crystallinity | Resin | Thickness (mm) | Expansion ratio | Resin | Thickness (μm) | Crystallinity |
| Example 1 | SPS-1 | 5 | 40% | GPPS | 5 | 50 | — | — | — |
| Example 2 | SPS-1 | 20 | 35% | GPPS | 3 | 20 | — | — | — |
| Example 3 | SPS-1 | 20 | 31% | GPPS | 3 | 20 | — | — | — |
| Example 4 | SPS-1 | 450 | 43% | GPPS | 3 | 20 | — | — | — |
| Comparative Example 1 | — | — | — | GPPS | 3 | 20 | — | — | — |
| Comparative Example 2 | — | — | — | HIPS | 3 | 20 | — | — | — |
| Comparative Example 3 | — | — | — | SMA | 3 | 20 | — | — | — |
| Example 5 | SPS-1 | 20 | 35% | GPPS | 3 | 20 | SPS-1 | 20 | 35% |
| Example 6 | SPS-1 | 20 | 35% | GPPS | 3 | 20 | GPPS | 10 | — |
| Example 7 | SPS-1 | 100 | 40% | PPO | 3 | 20 | — | — | — |
| Comparative | PET | 20 | 35% | GPPS | 3 | 20 | — | — | — |

TABLE 1-continued

| | | | | | | | | |
|---|---|---|---|---|---|---|---|---|
| Example 4 Comparative Example 5 | PP | 20 | 55% | GPPS | 3 | 20 | — | — | — |
| Example 8 | SPS-2 | 480 | 38% | GPPS | 3 | 20 | — | — | — |

| | Lamination method | Thermoforming Forming method | Forming temperature °C. | Heat resistance | Retention of flexural strength (%) | Appearance of test piece |
|---|---|---|---|---|---|---|
| Example 1 | A* | vacuum forming | 280 | A | 95 | good |
| Example 2 | A* | pressure forming | 280 | A | 95 | good |
| Example 3 | B* | pressure forming | 140 | A | 95 | good |
| Example 4 | C* | vacuum forming | 280 | A | 96 | good |
| Comparative Example 1 | — | vacuum forming | 180 | C | 92 | good |
| Comparative Example 2 | — | vacuum forming | 180 | C | 90 | good |
| Comparative Example 3 | — | vacuum forming | 200 | B | 94 | good |
| Example 5 | A* | vacuum forming | 140 | A | 95 | good |
| Example 6 | A* | vacuum forming | 140 | A | 97 | good |
| Example 7 | A* | vacuum forming | 160 | A | 98 | good |
| Comparative Example 4 | A* | pressure forming | 160 | A | 13 | delamination |
| Comparative Example 5 | D* | pressure forming | 160 | B | 21 | delamination |
| Example 8 | C* | pressure forming | 140 | A | 95 | good |

A*: extrusion lamination A
B*: extrusion lamination B
C*: coextrusion lamination
D*: dry lamination

What is claimed is:

1. A styrenic resin laminate which comprises at least one surface layer consisting essentially of a styrenic polymer having a high degree of syndiotactic configuration having a proportion of racemic diad of at least 75% or a proportion of racemic pentad of at least 30%;

a foam layer consisting essentially of a styrenic resin; and optionally a surface layer other than said styrenic polymer having a high degree of syndiotactic configuration layer, wherein said at least one surface layer consisting essentially of styrenic polymer having a high degree of syndiotactic configuration has a weight average molecular weight of 50,000 to 2,000,000; and a ratio of the total thickness of said foam layer and said surface layer other than said styrenic polymer having a high degree of syndiotactic configuration layer, if present, to the thickness of said at least one surface layer consisting essentially of said styrenic polymer having a high degree of syndiotactic configuration is in the range of 4 to 25,000:1.

2. The laminate according to claim 1, wherein said styrenic resin is selected from the group consisting of general-purpose polystyrene (GPPS) resin of atactic configuration, polystyrene resin of isotactic configuration, high impact polystyrene resin (HIPS), acrylonitrile/butadiene/styrene (ABS) resin, styrene/maleic anhydride (SMA) copolymer, acrylonitrile/styrene (AS) resin a blend of HIPS and polyphenylene ether (modified PPO) and a mixture thereof.

3. The laminate according to claim 1 wherein said laminate comprises a surface layer of SPS and said foam layer.

4. The laminate according to claim 1 wherein said laminate comprises two surface layers of SPS and said foam layer interposed therebetween.

5. The laminate according to claim 1 wherein said laminate comprises a surface layer of SPS, a second surface layer of a styrenic resin and said foam layer interposed therebetween.

6. The laminate according to claim 1 wherein the ratio of the thickness of the foam layer to the total thickness of at least on surface layer of SPS is in the range of 4 to 25,000.

7. The styrenic resin laminate of claim 1, wherein said styrenic polymer having a high degree of syndiotactic configuration has a racemic pentad of at least 30%.

8. The styrenic resin laminate of claims 1, wherein said styrenic polymer having a high degree of syndiotactic configuration has a racemic pentad of at least 50%.

9. A molding formed by thermoforming a styrenic resin laminate which comprises at least one surface layer consisting essentially of a styrenic polymer having a high degree of syndiotactic configuration having a proportion of racemic diad of at least 75% or a proportion of racemic pentad of at least 30%;

a foam layer consisting essentially of a styrenic resin; and optionally a surface layer other than said styrenic polymer having a high degree of syndiotactic configuration layer, wherein said at least one surface layer consisting essentially of styrenic polymer having a high degree of syndiotactic configuration has a weight average molecular weight of 50,000 to 2,000,000; and a ratio of the total thickness of said foam layer and said surface layer other than said styrenic polymer having a high degree of syndiotactic configuration layer, if present, to the thickness of said at least one surface layer consisting essentially of said styrenic polymer having a high degree of syndiotactic configuration is in the range of 4 to 25,000:1.

10. The molding according to claim 9 wherein said SPS has a crystallinity of at least 20% after thermoforming.

11. The molding according to claim 9, wherein said styrenic resin is selected from the group consisting of general-purpose polystyrene (GPPS) resin of atactic configuration, polystyrene resin of isotactic configuration, high impact polystyrene resin (HIPS), acrylonitrile/butadiene/styrene (ABS) resin, styrene/maleic anhydride (SMA) copolymer, acrylonitrile/styrene AS) resin, a blend of HIPS and polyphenylene ether (modified PPO) and a mixture thereof.

12. The molding according to claim 9, wherein said said laminate comprises a surface layer of SPS and said foam layer.

13. The molding according to claim 9, wherein said said laminate comprises two surface layers of SPS with said foam layer being interposed therebetween.

* * * * *